(12) United States Patent
Doany et al.

(10) Patent No.: US 6,371,616 B1
(45) Date of Patent: Apr. 16, 2002

(54) INFORMATION PROCESSING MINIATURE DEVICES WITH EMBEDDED PROJECTORS

(75) Inventors: Fuad Elias Doany, Katonah; Dimitri Kanevsky, Ossining; Clifford A. Pickover; Alexander Zlatsin, both of Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,633

(22) Filed: Nov. 12, 1999

(51) Int. Cl.[7] .................. G02B 21/36; G03B 21/16; G03B 21/14; G03B 21/00; G02F 1/1335
(52) U.S. Cl. .................. 353/39; 353/52; 353/79; 353/119; 353/122; 349/7
(58) Field of Search .................. 353/39, 43, 52, 353/71, 79, 119, 122; 349/5, 7; 364/231, 231.1, 231.2, 231.3, 231.31

(56) References Cited

U.S. PATENT DOCUMENTS

| | | | | |
|---|---|---|---|---|
| 5,500,692 A | * | 3/1996 | Onozuka | 348/759 |
| 5,584,554 A | * | 12/1996 | Moore et al. | 353/122 |
| 5,671,993 A | * | 9/1997 | Shikama | 353/77 |
| 5,680,233 A | * | 10/1997 | Faris et al. | 359/41 |
| 5,798,864 A | * | 8/1998 | Sekiguchi | 359/559 |
| 5,836,666 A | * | 11/1998 | Aoyama et al. | 353/122 |
| 5,986,634 A | * | 11/1999 | Alioshin et al. | 345/126 |
| 6,012,816 A | * | 1/2000 | Beiser | 353/122 |
| 6,211,903 B1 | * | 4/2001 | Bullister | 348/14.16 |

FOREIGN PATENT DOCUMENTS

| | | |
|---|---|---|
| EP | 0782307 A2 | 7/1997 |
| EP | 0818764 | 1/1998 |
| JP | 0649263 A2 | 10/1994 |
| JP | 08023501 A | 1/1996 |
| JP | 10217449 | 2/2000 |
| WO | WO 95/08132 | 3/1995 |
| WO | WO 97/42560 | 11/1997 |

* cited by examiner

Primary Examiner—Russell Adams
Assistant Examiner—Magda Cruz
(74) Attorney, Agent, or Firm—Scully, Scott, Murphy & Presser; Daniel P. Morris, Esq.

(57) ABSTRACT

Miniature devices which incorporate data displaying features, incorporating an information processing and display system, which includes devices for the representation of textural and pictorial information and data, and which is adapted to project images onto a remote display surface. Also disclosed is a method for utilizing miniature information processing devices which incorporate projectors for projecting data onto remote surfaces.

26 Claims, 5 Drawing Sheets

FIG. 4A
FIG. 4C
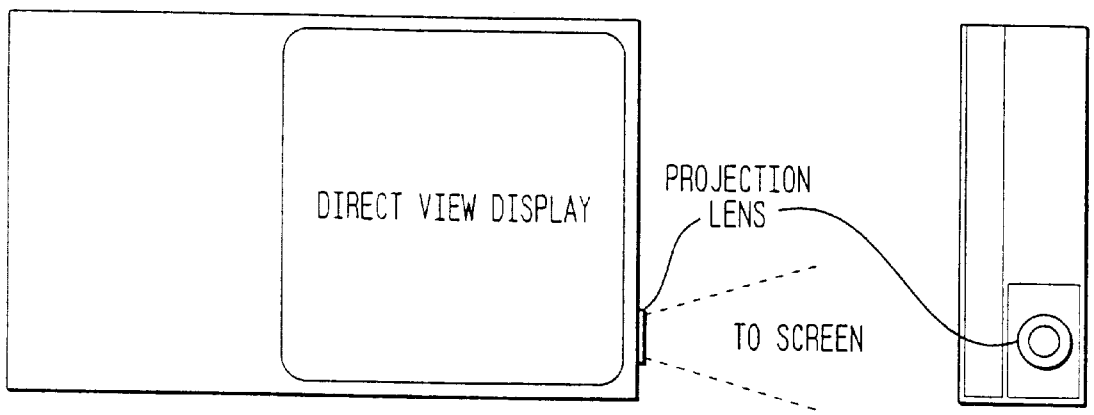
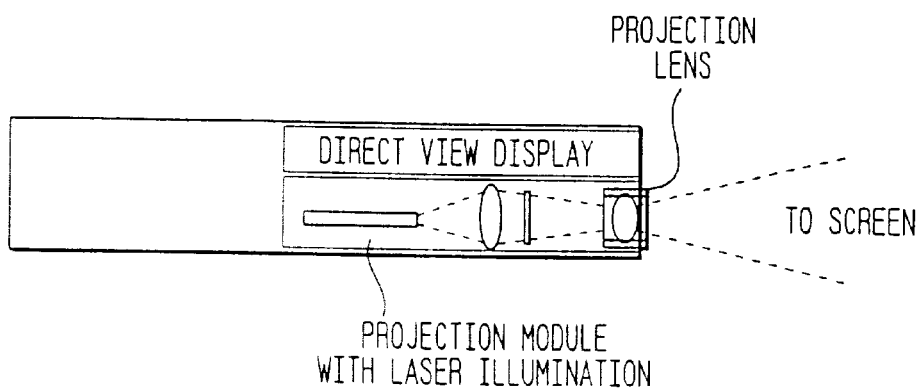
FIG. 4B

FIG. 6A
FIG. 6C
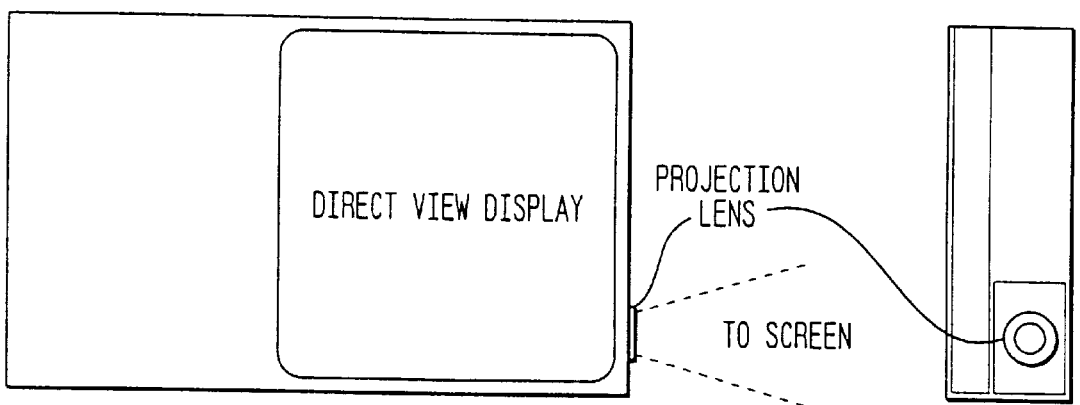
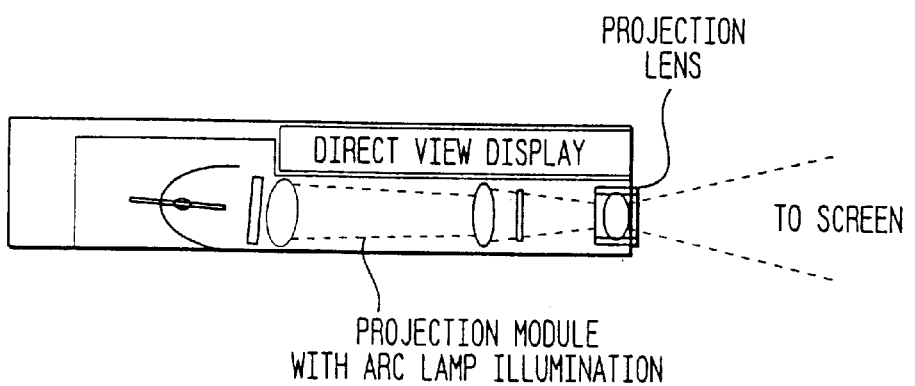
FIG. 6B

INFORMATION PROCESSING MINIATURE DEVICES WITH EMBEDDED PROJECTORS

BACKGROUND OF THE INVENTION

The present invention relates to miniature devices which incorporate data displaying features. Moreover, the invention is further directed to the provision of an information processing and display system, which includes devices for the representation of textural and pictorial information and data, and which is adapted to project images onto a remote display surface. In addition thereto, the invention is directed to a method for utilizing miniature information processing devices which incorporate projectors for projecting data onto remote surfaces.

Upon occasion, it is difficult to be able to project images onto remote surfaces, such as screens, ceilings, walls or the like through the intermediary of miniature projecting devices, the latter of which may be in the nature of readily portable or easily carried arrangements.

SUMMARY OF THE INVENTION

Accordingly, pursuant to the present invention there is provided an information processing and image displaying system which may incorporate at least one or possibly a plurality of embedded or encapsulated data processing devices having a miniature display for watching this data. An embedded module of the system facilitates the projection of the data onto remote screens or surfaces, whereas furthermore, a control device may be provided and which is adapted to process data through a projector module so as to manipulate or control the quality of the display on the surface onto which the data or pictorial representation has been projected.

In order to achieve the foregoing, pursuant to the invention, the miniature object which is equipped with the information processing and playing system, may be a suitably small and portable article; for example, such as a PDA, a clock, a portable telephone incorporating a display screen, a web telephone, a smart telephone, a pager, a smart wallet, a smart key, a wrist watch or pocket watch, or the like among numerous other articles.

The embedded data processing device incorporates a projector module which may be equipped with a laser device for producing and projecting high-quality contrast images; and wherein a control device facilitates varying the image quality, intensity of colors, clarity and contrast through the intermediary of sensors which measure environmental or surrounding conditions. These conditions are, essentially, the presence of lighting proximate a projector module, lighting proximate a screen onto which the image is projected, and are additionally a measurement of wind, rain, distances from the screen and the projector, and the measurement of the boundary or confines of the screen.

Moreover, the control device may be equipped with a focusing system which facilitates the focusing of images on the screen, and may also incorporate a sub-system for the automatic regulation of image quality, intensity of colors, and image contrast depending upon data derived from the sensors which measure the environmental or surrounding conditions, such focusing is being adapted to be actuated in an automatic manner.

Accordingly, it is an object of the present invention to provide an information processing, and display system which may be embedded or encased in a miniaturized or small-sized portable article, and which is adapted to project high-quality data or pictorial representations onto a remote screen or surface.

A further object of the present invention is to provide a system of the type described herein, wherein a control device is incorporated into the system for measuring environmental conditions, and which is able to vary image quality, intensity of colors, clarity and contrast of the projected display on a screen in response to data derived from sensors which are incorporated therein.

A still further object resides in the provision of a projector module which is incorporated into the information processing and display system which includes a laser device for producing high quality contrast images which are adapted to be projected onto a remote screen or surface.

Moreover, the invention is also directed to a method for utilizing a miniature device incorporating an embedded projector for projecting images onto a remote flat surface or objects.

Still another object arises in the provision of a method for utilizing the information processing and display system which incorporates a laser projector module for producing high quality contrast images, and a control device for regulating and varying the image quality, colors, clarity and contrast in correlation with sensorially detected environmental and surrounding conditions.

BRIEF DESCRIPTION OF THE DRAWINGS

Reference may now be had to the following detailed description of preferred embodiments of the invention, taken in conjunction with the accompanying drawings; in which:

FIGS. 4A, 4B and 4C illustrate respectively, top, side and front views of a PDA with a laser projection module which is adapted to be incorporated into a miniaturized article;

FIGS. 6A, 6B and 6C illustrate respectively, top, side and front views of a PDA (personal digital assistant) with an arc lamp projection module adapted to be utilized in connection with a miniaturized device pursuant to the invention.

DETAILED DESCRIPTION OF PREFERRED EMBODIMENTS

Figures 1A, 1B:
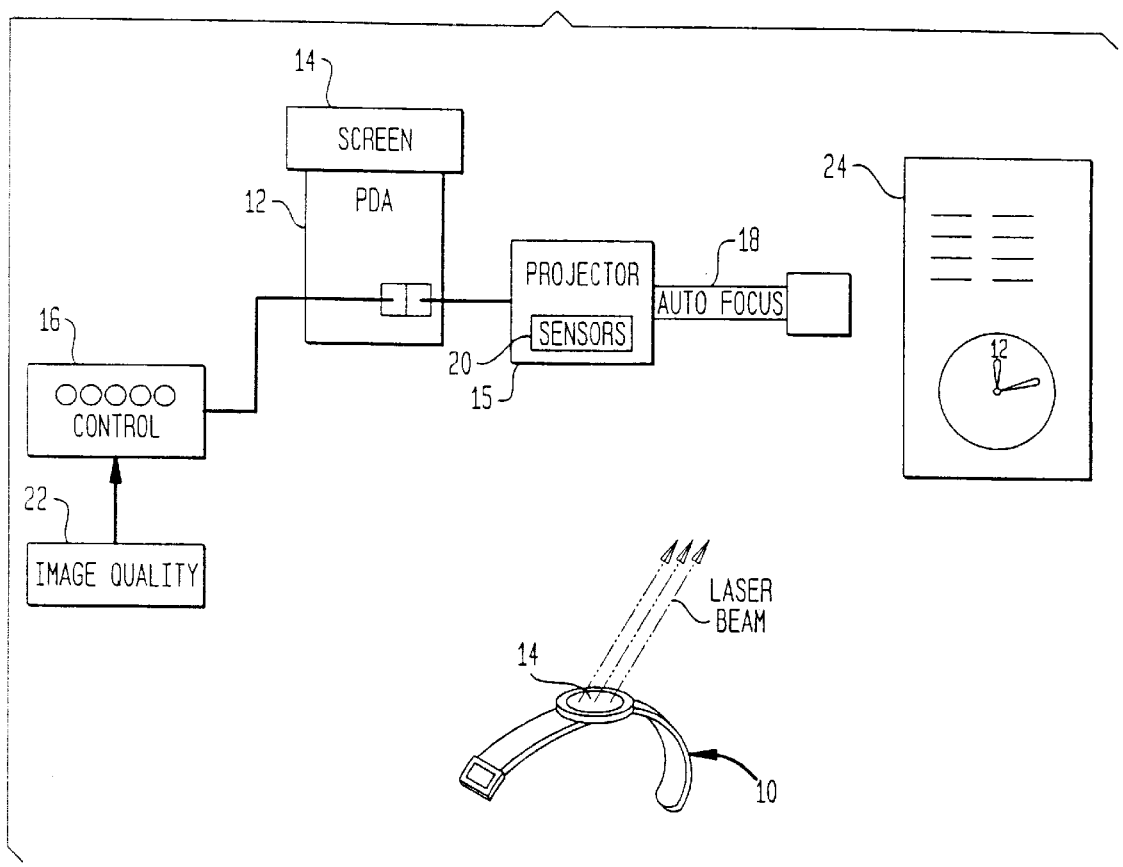
FIG. 1A illustrates a generally schematic block circuit diagram of a projection system which is embedded in a miniature-sized article such as for example, a wristwatch shown in FIG. 1B.
Figure 2:
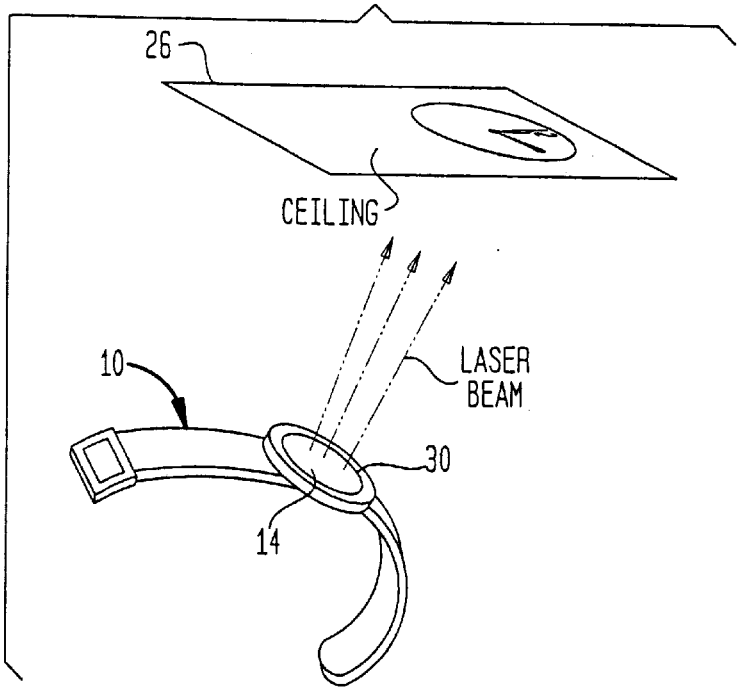
FIG. 2 illustrates the projection of an image from a wrist watch possessing an embedded projection system for information processing and projecting an image display onto a surface in the nature of a room ceiling.

Referring in specific detail to FIGS. 1 and 2, a wrist watch 10 possesses embedded therein, a PDA 12 and display 14, and includes a control unit or module 16 operatively connected to the PDA (personal digital assistant) device 12. Moreover, a projector module 15 includes an automatic focus 18 and sensors 20 for sensing external environmental and surrounding conditions.

An image quality module 22 is operatively connected to the control unit 16, and wherein a laser beam LB is adapted to be projected or beamed from the projector 15 so as to provide an image on a remote screen 24; in this instance, displaying a representation of a clock and other data, as shown in generally diagrammatic illustration.

As shown in FIG. 2 of the drawings, the laser beam LB may be projected against the ceiling 26 of a room, which essentially forms the screen or remote viewing surface, so as to display the image; i.e., the clock or time, shown in FIG. 1 in that enlarged manner. Naturally, other surfaces, such as vertical walls, floors, standard projection screens, sheets of paper or any other suitable surface, irrespective as to whether flat or somewhat curved, may be adapted to have the image and data projected thereon by means of the present projection system.

As illustrated, the projector module 15 is equipped with a laser device 30 for the generating of laser beams LB projecting high quality images of the data display 14 onto the remote screen.

The control unit or module 16, as shown in FIG. 1, is adapted to provide a control over variations in image quality, intensity of colors, clarity and contrast in correlation with the function of the sensors 20 which sense and measure environmental or surrounding conditions, such as the lighting proximate the projector module, lighting which is encountered near the remote screen onto which the data or image is to be projected, and weather conditions such as wind and rain, distance of the projector module or laser device from the screen, and adapted to provide a boundary for the screen.

Moreover, the focusing of the image is implemented by means of the automatic focus device 18 providing a system which enables the appropriate focusing of images or data onto the remote screen, and which may also be equipped with a sub-system for the automatic and concurrent control over image quality, intensity of colors, and contrast depending upon data received from the sensors which sense and measure environmental or surrounding conditions. As indicated, the focus 18 is preferably automatically controlled.

Furthermore, the control unit or module 16 may also be equipped with a suitable sub-system which is also adapted to regulate or control the form of the boundary of the display on the screen, such as in the shape of a square, circle, oval, polygon or any other suitable configuration. This control sub-system may be automatically operated in response to the data received from the sensors.

The sensors 20, as schematically indicated, may include a video camera or any other kind of camera system.

Although the miniature device is illustrated to be a wrist watch 10, it may also be a PDA, a clock, a telephone equipped with a display screen, a web phone, a smart phone, a pager, a smart wallet, a smart key, or a pocket watch or wrist watch, among other suitable small-sized or miniature objects which may be either worn or carried on the body of a person, carried in a readily portable manner, such as in a briefcase, or installed in a home, office or automobile, as may be required.

Figure 3A:
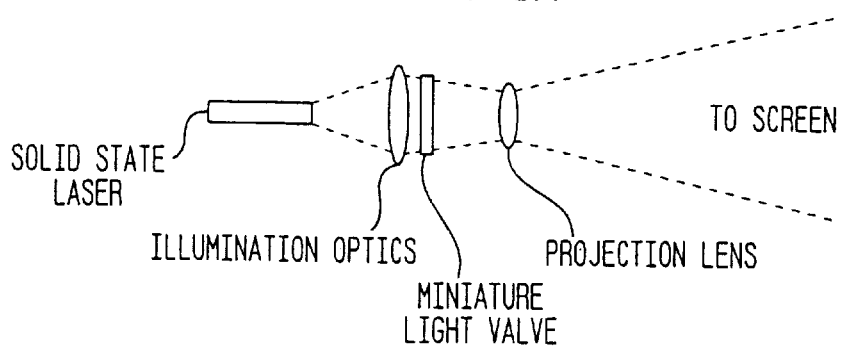
FIGS. 3a and 3b illustrate a projection module utilizing, respectively, a laser and miniature arc lamp for a monotone projection.
Figure 3B:
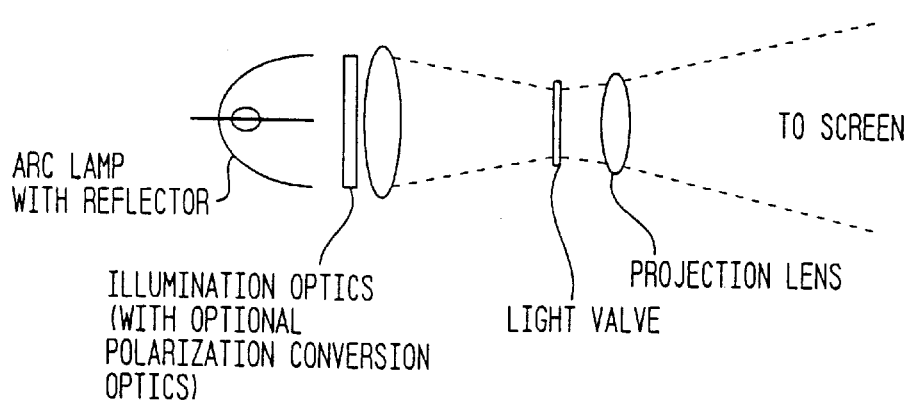

Referring to FIGS. 3a, 3b and 4 of the drawings, there is illustrated a projection module utilizing a system of laser illumination in FIG. 3a and a system of arc lamp illumination in FIG. 3b and 6 showing the projection of the date display onto the screen from the embedded system.

Figure 5A:
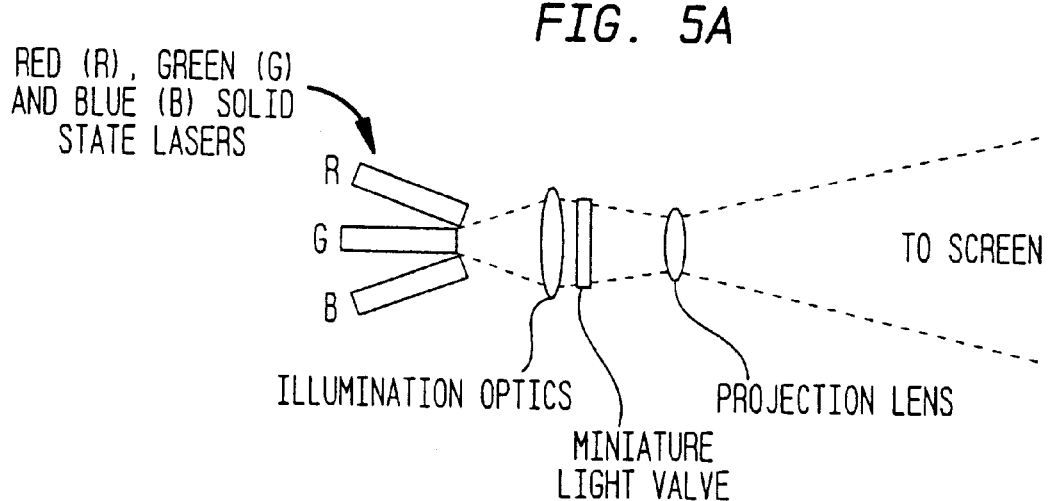
FIGS. 5a and 5b illustrate a color projection module utilizing, respectively, a laser and miniature arc lamp.
Figure 5B:
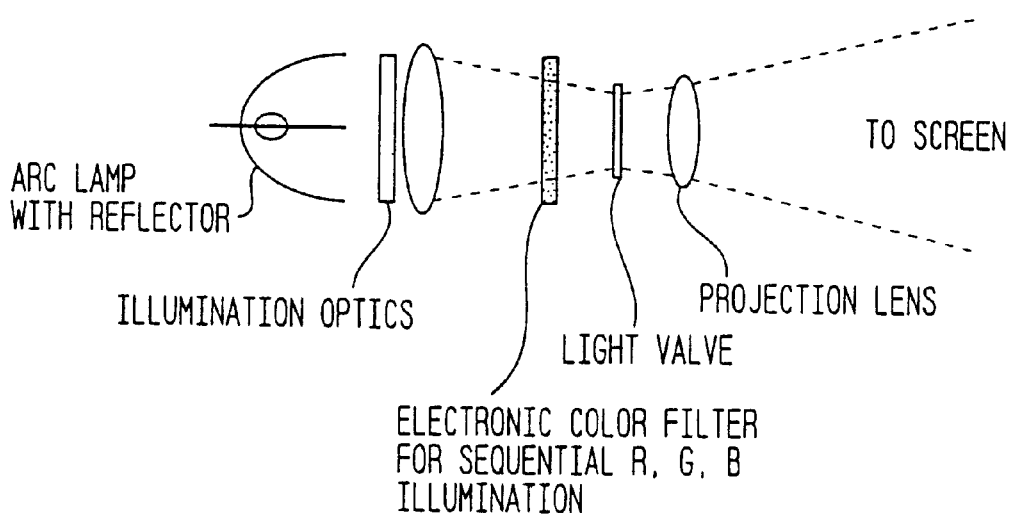

FIGS. 5a and 5b illustrate top, front and side views of a color projection module utilizing, respectively, a laser illumination system and miniature arc lamp illumination system wherein rather than in a single monotone, there may be projected red, green and blue solid state laser optics, or electronic color filters, as applicable.

In essence, the projector module may be comprised of an illumination source, illumination optics, an image forming module, and a projection lens. The illumination source can be a miniature solid state laser device or a miniature high intensity lamp such as metal halide arc lamp. For lamp illumination, the illumination optics may also include polarization conversion optics to provide polarized light with optimum efficiency. The illumination light is directed onto the image forming module by the illumination optics. The image forming module is a miniature light valve, such as a transmission or reflective liquid crystal light valves. Liquid crystal transmission light valves as small as 0.25" diagonal are commercially available today (Kopin Corp.). A lens is used to magnify and project the image through the light valve onto a screen.

Alternatively, the PDA or the projector module may be equipped with an arc lamp illumination system rather than laser as illustrated in FIGS. 3B, 5 and 6 of the drawings which is similar in operation to the laser illumination but, in this instance, utilizes an arc lamp system.

For color application, two types of projectors can be employed. The first uses a light valve where each displayed pixel is composed of three sub-pixels, one for each color component (red, green and blue). Each of the three sub-pixels includes a different color filter, one green, one red and one blue. The number of sub-pixels in the light valve is therefore 3× the displayed pixels. In this mode, white light illumination is used to illuminate the light valve. The transmitted light is filtered into red, green and blue to form the full color image.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What we claim is:

1. An information processing-display system, comprising arranged in a miniature and portable encasing one or a plurality of data processing devices including a miniature display for viewing the data; a projector module facilitating projecting the data onto a remote screen; and a control device for processing data through said projector module and for controlling the quality of the projected display on said screen, said control device being equipped with video sensors for measuring external environmental conditions selectively including lighting near the projector module, lighting near the screen, wind, rain, distance from a screen, or which form the boundary of the screen.

2. A system as claimed in claim 1, wherein said embedded data processing device is selected from the group consisting of a PDA, clock, a telephone with screen, web-phone, smart phone, pager, a smart wallet, a smart key, watch, and glasses connected to the embedded device.

3. A system as claimed in claim 1, wherein said projector module is equipped with a laser device for projecting high quality contrast images onto said screen.

4. A system as claimed in claim 1, wherein said control device varies the image quality, intensity of colors, clarity and contrast of the images projected onto the screen.

5. A system as claimed in claim 1, wherein said control device is equipped with a focus system for focusing the images projected onto said screen.

6. A system as claimed in claim 5, wherein the focus is regulated automatically.

7. A system as claimed in claim 1, wherein said control device is equipped with a subsystem for an automatic control over the projected image quality, intensity of colors, contrast depending upon data obtained from the sensors which measure the environmental conditions.

8. A system as claimed in claim 1, wherein the screen is selected from the group consisting of a standard screen for projectors, a paper, a floor, a ceiling, wall, any cover of any form, such as square, circle, oval, or polygon.

9. A system as claimed in claim 1, wherein said control device is equipped with a subsystem facilitating control over the form of a boundary of a display on a screen, such as square, circle, oval, or polygon.

10. A system as claimed in claim 9, wherein said subsystem is operated automatically using data obtained from sensors.

11. A system as claimed in claim 1, wherein said sensors include a camera or a video camera.

12. A system as claimed in claim 1, wherein the miniature display is employed as an output means for projector beams.

13. A system as claimed in claim 1, wherein the displays are glasses.

14. An information processing-displaying method, comprising arranging in a miniature and portable encasing one or a plurality of data processing devices including a miniature display for viewing the data; a projector module projecting data onto a remote screen; and a control device processing data through said projector module for controlling the quality of the projected display on said screen, said control device being equipped with video sensors which measure environmental conditions selectively including lighting near the projector module, lighting near the screen, wind, rain, distance from a screen, or form the boundary of the screen.

15. A method as claimed in claim 14, wherein said embedded data processing device is selected from the group consisting of a PDA, clock, a telephone with screen, webphone, smart phone, pager, a smart wallet, a smart key, watch, and glasses connected to the embedded device.

16. A method as claimed in claim 14, wherein said projector module is equipped with a laser device for projecting high quality contrast images onto said screen.

17. A method as claimed in claim 14, wherein said control device varies the image quality, intensity of colors, clarity and contrast of the images projected onto the screen.

18. A method as claimed in claim 14, wherein said control device is equipped with a focus system for focusing the images projected onto said screen.

19. A method as claimed in claim 18, wherein the focus is regulated automatically.

20. A method as claimed in claim 14, wherein said control device is equipped with a subsystem for an automatic regulation of image quality, intensity of colors, contrast depending upon data obtained from the sensors which measure the environmental conditions.

21. A method as claimed in claim 14, wherein the screen is selected from the group consisting of a standard screen for projectors, a paper, a floor, a ceiling, wall, any cover of any form, such as square, circle, oval, or polygon.

22. A method as claimed in claim 14, wherein said control device is equipped with a subsystem so as to regulate the form of a boundary of the display on said screen, such as square, circle, oval, or polygon.

23. A method as claimed in claim 22, wherein said regulating subsystem is operated automatically using data obtained from sensors.

24. A method as claimed in claim 14, wherein said sensors include a camera or a video camera.

25. A method as claimed in claim 14, wherein the miniature display is employed as an output for projector beams.

26. A method as claimed in claim 14, wherein the displays are glasses.

* * * * *